US012722976B2

(12) United States Patent
Masson et al.

(10) Patent No.: US 12,722,976 B2
(45) **Date of Patent: *Sep. 1, 2026**

(54) BIO-BASED CARBON FOAM

(71) Applicant: Stora Enso OYJ, Helsinki (FI)

(72) Inventors: David Masson, Johanneshov (SE); Stephan Walter, Bochum (DE); Oruç Köklükaya, Lindingö (SE); Daniel Hult Torron, Täby (SE)

(73) Assignee: Stora Enso OYJ, Helsinki (FI)

( * ) Notice: Subject to any disclaimer, the term of this patent is extended or adjusted under 35 U.S.C. 154(b) by 661 days.

This patent is subject to a terminal disclaimer.

(21) Appl. No.: 18/246,216

(22) PCT Filed: Sep. 27, 2021

(86) PCT No.: PCT/IB2021/058783

§ 371 (c)(1), (2) Date: Mar. 22, 2023

(87) PCT Pub. No.: WO2022/064456

PCT Pub. Date: Mar. 31, 2022

(65) Prior Publication Data

US 2023/0357013 A1 Nov. 9, 2023

(30) Foreign Application Priority Data

Sep. 28, 2020 (SE) .................................. 2051123-4

(51) Int. Cl.
*C01B 32/05* (2017.01)
*C04B 111/00* (2006.01)

(52) U.S. Cl.
CPC .......... *C01B 32/05* (2017.08); *C01P 2006/10* (2013.01); *C01P 2006/16* (2013.01); *C04B 2111/00017* (2013.01)

(58) Field of Classification Search
CPC ... C01B 32/05; C01B 32/382; C01P 2006/10; C01P 2006/16; C01P 2006/12;
(Continued)

(56) References Cited

U.S. PATENT DOCUMENTS 3,894,878 A 7/1975 Mansmann et al.
2015/0284252 A1 10/2015 Karthik et al.

FOREIGN PATENT DOCUMENTS

CN 107021486 A 8/2017
CN 108483443 A 9/2018
(Continued)

OTHER PUBLICATIONS

Rutledge, et al., Carbonized Starch Microcellular Foam-Cellulose Fiber Composite Structures, BioResources 2008; 3(4): 1063-1080 (Year: 2008).*

(Continued)

*Primary Examiner* — Daniel C. McCracken
(74) *Attorney, Agent, or Firm* — Greer, Burns & Crain, Ltd.

(57) ABSTRACT

The present invention relates to bio-based carbon foams, a method for their manufacturing and their use. The method comprises foaming a slurry of cellulose fibres and a biomass component to obtain a biomass-cellulose fibre foam, and carbonization of said biomass-cellulose fibre foam.

12 Claims, 1 Drawing Sheet

(58) Field of Classification Search

CPC ....... C04B 38/0022; C04B 2111/00017; C04B 2111/00258; C04B 2111/00267; C04B 2111/00284; C04B 2111/20; C04B 2111/28; C04B 2111/40; C04B 2111/52; C04B 2235/48; C04B 2235/5248; C04B 2235/5445; C04B 2235/616; C04B 2235/6562; C04B 2235/6567; C04B 2235/77; C04B 2235/775; C04B 35/524; C04B 35/6263; C04B 35/6264; C04B 35/62655; C04B 35/6365; C04B 38/007; C04B 38/10; C04B 38/0054; C04B 38/0067; C04B 38/103; B01J 20/28011; B01J 20/28057; B01J 20/28078; B01J 20/28045; B01J 2220/4831; B01J 2220/4837; B01J 20/20; B01J 20/3078; B01J 20/3085; C09C 1/44; C08J 9/00; C08J 9/36; C08J 2301/02; C08J 2497/00

See application file for complete search history.

(56) References Cited

FOREIGN PATENT DOCUMENTS

| | | | |
|---|---|---|---|
| CN | 110817837 | A | 2/2020 |
| JP | 2023544542 | A | 9/2021 |
| WO | 2015200584 | A1 | 12/2015 |
| WO | 2020011587 | A1 | 1/2020 |
| WO | 2020049226 | A1 | 3/2020 |
| WO | 2020049227 | A1 | 3/2020 |
| WO | 2022064457 | A | 3/2022 |

OTHER PUBLICATIONS

Extended European Search Report from corresponding European application No. 21871809.6 dated Sep. 30, 2024.

International Search Report from corresponding PCT application No. PCT/IB2021/058783, mailed on Dec. 23, 2021.

Toni Varila et al., Catalytic Effect of Transition Metals (Copper, Iron, and Nickel) on the Foaming and Properties of Sugar-Based Carbon Foams, Topics in Catalysis (2019) 62: 764-772.

R. Narasimman et al., Preparation of low density carbon foams by foaming molten sucrose using an aluminum nitrate blowing agent, Carbon 50 (2012) 1999-2009.

M. Letellier et al., Tannin-Based Carbon Foams for Electromagnetic Applications, IEEE Transactions on Electromagnetic Compatibility, vol. 57, No. 5, Oct. 2015.

Hongjiu Hu et al., Design and Performance of Non-asbestos Gasket Composite Materials, Shanghai University Press, Mar. 31, 2006, p. 37.

Chinese Office Action from corresponding Chinese patent application No. 202180066155.3 dated Nov. 25, 2024.

Yun Wei et al., Preparation and microwave absorbing properties of carbon fibers derivated from natural cellulose, Chemical Research No. 6, Dec. 31, 2017, 28(6), 734-739., DOI: 10.14002/j.hxya.2017.06.012.

Shiya Geng et al., Multifunctional Carbon Aerogels with Hierarchical Anisotropic Structure Derived from Lignin and Cellulose Nanfibers for CO2 Capture and Energy Storage, ACS Appl. Mater. Interfaces 2020, 12, 7432-7441.

Chinese Office Action from corresponding Chinese patent application No. 202180066155.3, dated Feb. 28, 2024.

Jia Yushan et al., Processing and Storage of Grass Products, China Agriculture Press, Feb. 2019, p. 207.

Chinese Office Action from corresponding Chinese patent application No. 202180066155.3 dated Sep. 13, 2024.

Jia Yushan et al., Processing and Storage of Grass Products, China Agriculture Press, Feb. 2019, p. 207, Cited in the Office Action for a Foreign Equivalent. Office Action containing the basis for citing this reference is being submitted herewith.

* cited by examiner

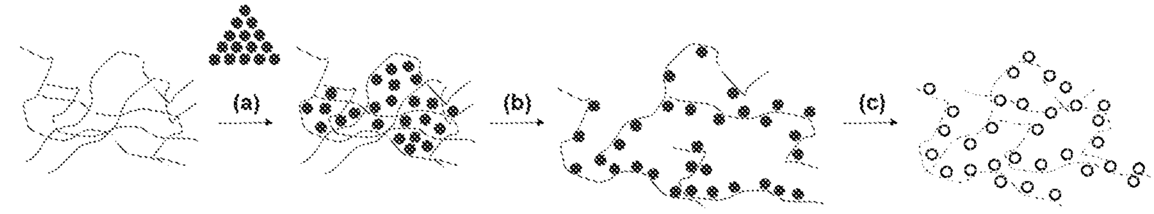
(a)
(b)
(c)

BIO-BASED CARBON FOAM

This application is a U.S. National Phase under 35 U.S.C. § 371 of International Application No. PCT/IB2021/058783 filed Sep. 27, 2021, which claims priority under 35 U.S.C. §§ 119 and 365 to Swedish Application No. 2051123-4 filed Sep. 28, 2020.

FIELD OF THE INVENTION

The present invention relates to bio-based carbon foams, a method for their manufacturing and their use.

TECHNICAL BACKGROUND

In our everyday life, macroporous and microporous materials are used in various forms and compositions. Carbon foams are porous materials formed from a web of carbon atoms and may have a very large specific surface area and a high adsorption capacity. These materials are expected to contribute to modern technologies, for example as electrodes for electrochemical devices, absorbents for large molecules, thermal insulators for aerospace components, and other applications that need lightweight, robust and highly resistant materials.

Known techniques for making carbon foams involve mixing of different precursors. State of art precursors are typically based on fossil-based chemicals such as pitch, isocyanate, polyols, cross linkers, chain extenders and surfactants, but also inorganic compounds, for instance catalysts. Each precursor requires different treatments during the foaming process.

A conventional method for preparing carbon foams is the template route, which comprises the use of commercially available open cell polyurethane foams as a template. The polyurethane foam is impregnated with a slurry, such as a phenolic resin or pitch, and is then cured and carbonized under inert gas to form a carbon-foam structure. This method is simple and easily scalable, but both the template and the precursors are fossil-based. Another method is the direct foaming, which involves generation of bubbles inside a liquid slurry comprising the precursor and blowing agents. The gas bubbles, typically $CO_2$, are generated due to a chemical reaction of the blowing agent during the first step of the foaming process. When a stable porous network has been formed, it is dried out and carbonized under an inert gas. The direct foaming route uses numerous fossil-based precursors. A third method is the indirect foaming, which involves the preparation of a precursor slurry, which is then flushed with nitrogen gas under pressurized atmosphere in a heat insulated reactor. The obtained foam is then dried and carbonized. This process is complex and expensive on large scale.

It is highly motivated to replace fossil-based chemicals with more sustainable alternatives, such as use of renewable raw material resources, and for environmental and human health aspects. Cellulose has a special potential, being the most abundant renewable natural polymers on earth and because of the availability of methods for preparing large volumes on an industrial scale. Cellulose based porous materials are usually produced by using a water slurry of cellulose fibres as starting material. The water should be removed without causing collapse or shrinkage during drying of the wet porous cellulose material. Recently cellulose foams have been prepared from only biomass precursors, bio-foaming agents, water and air, such as described in WO2020/011587. WO2020/049226 discloses a porous formable material prepared from a lignin-containing fraction obtained from a lignocellulosic material. Publication U.S. Pat. No. 3,894,878 discloses the preparation of a porous formable material from an aqueous solution of lignin. However, there is still a need for environmentally friendly and inexpensive methods for preparing carbon foams.

BRIEF DESCRIPTION OF THE DRAWINGS

FIG. 1 illustrates the steps for preparation of a lignin-cellulose based carbon foam, by (a) preparing a slurry of lignin (●) and cellulose fibres (-), (b) foaming the slurry to provide a lignin-cellulose fibre foam, and (c) carbonization of the lignin-cellulose fibre foam to obtain a carbon foam, (in FIG. 1 (*c*) the (○) represents the carbonized lignin and (–·–·) represents the carbonized cellulose fibres).

DESCRIPTION OF THE INVENTION

The objective of this disclosure is to provide a carbon foam made from bio-based material.

In a first aspect, the present invention relates to a bio-based carbon foam characterized by having a density from 10 to 80 kg/m$^3$, or from 10 to 60 kg/m$^3$, and a mean pore diameter of from 0.5-10 mm, or from 1 to 10 mm.

The carbon foam according to the present invention has the advantage of being lightweight, non-flammable, resistant to chemicals, high-temperature resistant, permeable to gases and liquids as well as absorbing sound and radiation.

In a second aspect, the present invention relates to a method for the preparation of a bio-based carbon foam, comprising a) suspending cellulose fibres and a biomass component in a liquid medium to obtain a slurry, wherein the biomass component is selected from lignin and lignocellulosic materials;
b) foaming said slurry to obtain a biomass-cellulose fibre foam; and
c) carbonization of the biomass-cellulose fibre foam to obtain a bio-based carbon foam.

The slurry in step (a) may be prepared by soaking dry cellulose fibres in a liquid medium, followed by mixing it together with the biomass component using standard cellulose disintegration apparatuses. Optionally, the biomass component may also be soaked together with the dry cellulose fibres before mixing. The biomass component may be suspended in the liquid medium before the addition of cellulose fibres, suspended together with the cellulose fibres, or suspended in the liquid medium after the cellulose fibres have been suspended. Disintegrating the cellulose fibres in the liquid medium before adding the biomass component and then mixing, facilitates a homogeneous dispersion of the biomass component in the slurry. The biomass component being homogenously dispersed in the slurry enables the provision of a homogenous foam in the next step. The liquid medium used for suspending the cellulose fibres and biomass component may be an aqueous solution or water, preferably water. The suspension of the cellulose fibres and biomass component in the liquid medium may be made at a temperature from 10 to 50° C., from 15 to 50° C., or from 20 to 50° C. The slurry may have a total solid content of from 0.1-40 wt %, or from 0.1-5 wt %, or from 0.2 to 2 wt %, as calculated on the total weight of the slurry.

The biomass component used in the method according to the present invention is selected from lignin; lignocellulosic materials, such as wood particles, pulp, and wood fibres, e.g. dry lignocellulosic fibres, wood flour, fine cut cellulose pulp, sawdust, and lignin powder; and different combinations thereof. The biomass component is preferably lignin. Lignin used in the preparation of the slurry in step (a), may be in the form of particles. The average particle size may be in the range of from 0.1 μm to 20 μm, from 0.1 to 10 μm, from 0.1 μm to 5 μm, or 0.1 to 1 μm. The weight proportion of the biomass component to cellulose fibres is 3:1 to 1:3, preferably 2:1 to 1:2, more preferably 1:1, as calculated on the dry material.

Using different conditions when drying the slurry may influence the morphology of the final bio-based carbon foam, for example the possibility of obtaining homogenous foams or integral foams, such as having a porous inner core and being denser towards its outer boundary or surface. The amount of the biomass component affects the carbonization yield and carbon content in the carbon foam, and may also enable tailoring of pore sizes, pore characters and final chemical composition of the carbon foam. The biomass component, and especially lignin, also prevents shrinkage of the foam during carbonization.

In the method according to the present invention, additives may be added to the biomass-cellulose fibre slurry. The additive may be suspended in the liquid medium before the addition of biomass component and cellulose fibres, suspended together with the biomass component and the cellulose fibres, or added to the slurry after one of or both of the biomass component and cellulose fibres have been suspended. The additive may be a foaming agent, a thickener, or a plasticiser, preferably the additive is a bio-based additive. Examples of bio-based foaming agents are proteins, such as gluten, casein, hydrophobin and gelatine. The additive may be added to the biomass-cellulose fibre slurry as a powder or as an admixture to obtain a slurry of biomass component, cellulose fibres and additive with a total solid content of 0.1-40 wt %, as calculated on the total weight of the slurry, or from 0.1-5 wt %, or from 0.2-2 wt %. The ratio of the cellulose fibres and biomass component to the additive may affect the degree of flocculation and separation of the cellulose fibres.

In the method of the present invention the cellulose fibres and the biomass component are mixed to a slurry before the slurry is foamed, which enables the formation of a foam having a homogeneous distribution of the biomass component. Foaming of the slurry may be made by introduction of gas into the same. The gas may be introduced to the slurry by whipping or vigorous stirring, by the addition of blowing agents, by pressurizing the slurry with the gas, or by direct introduction of the gas. The gas introduced to the slurry may be selected from carbon dioxide, nitrogen, and inert gas, or air or mixtures thereof. Preferably, the gas is air. Air could be introduced by whipping or vigorous stirring, which are inexpensive and straightforward methods for creating a foam. The foaming may also be made by applying a high pressure followed by a pressure release, such as by applying a pressure in the range from 102-500 kPa, or from 102-300 kPa. The foaming may be made at a temperature from 5 to 100° C., from 10 to 100° C., from 10 to 80° C., from 10 to 60° C., from 10 to 40° C., from 20 to 60° C., or from 20 to 40° C. The volume of the slurry can increase with several hundred percent when foamed, such as with more than 200%, or even with up to 1000% or more, depending on the amount of dry weight of the cellulose. The obtained biomass-cellulose fibre foam may be cast into desired shapes, such as plates, 3D structures, thin layers, etc.

Before the biomass-cellulose fibre foam is carbonized it may be dried to reduce the content of the liquid medium, such as to a content of the liquid medium that is less than 15 wt % or less than 10 wt %, as calculated on the total weight of the biomass-cellulose fibre foam. Drying the biomass-cellulose fibre foam provides for a different porous structure than in the wet cellulose-biomass fibre foam, such as that the pores becoming larger in size. Drying of the biomass-cellulose fibre foam may be performed by various methods, such as by convective drying or by radiation at room temperature, such as from 15 to 30° C., or from 15 to 25° C.; or by subjecting the biomass-cellulose fibre foam to elevated temperatures, such as a temperature above 20° C., for example from 25 to 125° C., from 30 to 100° C., from 30 to 80° C., or from 50 to 80° C. An elevated temperature will shorten the time for drying the foam. An advantage with the method according to the present invention is that only moderate heating, or even no heating is required to obtain a dried biomass-cellulose fibre containing foam. The residence times for drying the biomass-cellulose fibre foam may be from 4 to 60 hours, or from 4 to 48 hours, or from 4 to 24 hours, or from 4 to 12 hours but may be adjusted depending on the drying method used. Different ovens such as baking ovens, curing ovens, drying ovens or industrial batch and continuous ovens can be used. The use of microwaves or a combination of microwaves and heat flow to heat the biomass-cellulose fibre foam from its inside can further speed up the drying time. Depending on the stability of the biomass-cellulose fibre foam also lower and higher temperatures may be used. However, a too high temperature can make the biomass-cellulose fibre foam inhomogeneous or even damage the foam, such as causing delamination or collapse of the structure. The drying temperature can also be changed during the drying, for example a lower initial temperature can be used with an increase in temperature over time. The liquid medium may also be removed by solvent exchange, for example water may be removed by solvent exchange with ethanol.

In the method according to the present invention, carbonization of the biomass-cellulose fibre foam may be made by raising the temperature in one or more steps at rates between 1 to 100° C./min, until a maximum temperature, $T_{max}$, in the range from 700 to 1500° C., is reached, more preferably the maximum temperature is from 800 to 1300° C., most preferably the maximum temperature is from 950 to 1150° C. In continuous furnaces, the heating and cooling may be performed more rapidly than in a static batch oven. The total time for the carbonization, including cooling, may be from 5 to 20 hours, from 10 to 20 hours, or from 15 to 20 hours. The carbonization may be performed under inert gas, such as nitrogen, helium, neon, or argon, or mixtures thereof. Carbonization of a dried biomass-cellulose fibre foam provides for a carbon foam that in principle have the same porous structure as the dried biomass-cellulose fibre foam. In an alternative embodiment, the carbonization may be made on the wet biomass-cellulose fibre foam.

Moist biomass-cellulose fibre foam can be collected and saved for later use, or filled in a mould, or by any other manner be formed to a desired shape, which enables the preparation of a carbon foam with a pre-determined shape after carbonization. Thus, one embodiment of the method of the present invention encompasses carbonization of a shaped biomass-cellulose fibre foam for providing a shaped carbon foam.

The carbon foam prepared according to the method of the present invention may be modified with additional components, such as hydrophobic agents, activating gas, coating layers or other chemicals; by thermal post-treatment; or a combination of these. The carbon foam may be activated to provide the foam with desired properties, such as specific absorbance properties or an increased specific surface area. Activation may be made by treating the foam with activation chemicals and heating to a temperature of 400 to 800° C., or by treating the foam with a gas at a temperature of about 800 to 1100° C. Suitable activation chemicals are selected from alkali salts, phosphoric acid, zinc chloride and sulfuric acid or a mixture thereof. The activation chemicals may assist in removal of remaining moisture from the material. Suitable gases for activation are selected from water vapor and carbon dioxide or a mixture thereof.

The present invention specifically encompasses a method for the preparation of a bio-based carbon foam, wherein the method comprises suspending lignin and cellulose fibres in a liquid to obtain a slurry; foaming the slurry to obtain a lignin-cellulose fibre foam; optionally casting the foam into shapes i.e. plates, 3D structures, thin layers, or other; drying the lignin-cellulose fibre foam; and carbonization of the foam.

An advantage with the method of the present invention is that it is environmentally friendly, involves simple technology and is easily scalable. The main components used in the method are bio-based and renewable. The liquid medium may be an aqueous solution or water. A further advantage is that the pores occurring in the biomass-cellulose fibre foam may be preserved during the carbonization, which provides for a low-density carbon loam. Mixing cellulose fibres and biomass component before foaming enables a homogeneous distribution of the biomass component in the foam. The homogeneous biomass-cellulose fibre mixture also foams uniformly throughout the whole mixture and thus enables that the final carbonized foam also become homogeneous. A further effect of using a foam prepared from a slurry comprising a biomass component and cellulose fibres in the process for preparing a carbon foam is the ability to make a supple, resilient carbon foam.

In a third aspect, the present invention relates to a carbon foam obtained with the method according to the second aspect of the invention. A further aspect of the present invention is an integral carbon foam comprising a porous core having a density and wherein the foam becomes denser closer to its surface. The integral structures resemble the structure of mammal bones and may therefore be used as a bone implant material and as scaffolds for osteogenic cells.

A yet further aspect is the use of the bio-based carbon foam according to the present invention in implants, electrodes for electrochemical devices, absorbents for large molecules, adsorbents, thermal insulators for high temperature applications, aerospace components, energy storage, catalyst substrates, and stealth technology.

All words and abbreviations used in the present application shall be construed as having the meaning usually given to them in the relevant art, unless otherwise indicated. For clarity, some terms are however specifically defined below.

The term bio-based material is used herein for any material made from substances derived from living, or once-living, organisms, plants, such as material obtained from wood, lignocellulosic materials, cellulose fibres, lignin, starch, proteins, polylactic acid, etc.

Cellulose is the main component in the cell walls of all plants. It can occur with different components depending on the type or part of the plant. In wood for example, cellulose occurs together with lignin and hemicelluloses. In leaves, the cellulose occurs lignin free but together with rich amounts of hemicelluloses. In the seed hairs of cotton, cellulose occurs in almost pure forms, free of lignin. The cellulose fibres suitable for preparing the carbon foam according to the present invention can originate from wood, such as softwood or hardwood, from leaves or from fibre crops (including cotton, flax and hemp). Suitable cellulose fibres can also originate from regenerated cellulose such as rayon and Lyocell. Preferably the cellulose fibres originate from wood, more preferably the cellulose fibres are pulp fibres obtained by pulping processes which liberates the fibres from the wood matrix. Pulp fibres can be liberated by mechanical pulping, obtaining mechanical pulp such as thereto mechanical pulp (TMP) or chemo thermo mechanical pulp (CTMP), or by chemical pulping such as Kraft pulp or pulps obtained by the sulphite process, soda process or organosolv pulping process. More preferably, the cellulose fibres are pulp fibres liberated by chemical pulping processes. Even more preferably the cellulose fibres are obtained from softwood Kraft pulp or dissolving pulp. The cellulose fibres used in the present invention may be free from lignin and hemicellulose. The different characteristic of each cellulose will affect the properties of the final carbon foam. A cellulose fibre is significantly longer than it is wide. Cellulose fibres can have a mean width of 0.01 to 0.05 mm. The mean fibre length of softwood can be from 2.5 to 4.5 mm, while hardwood can have a mean fibre length from 0.7 to 1.6 mm, and Eucalyptus from 0.7 to 1.5 mm. However, the fibre length can vary considerably with different growing place, etc. The cellulose fibres used for the preparation of the carbon foam disclosed herein can have a mean fibre length from 0.1 mm to 65 mm, from 0.1 mm to 10 mm, or from 0.5 mm to 65 mm, or from 0.5 mm to 10 mm, or from 0.5 mm to 7 mm. Different fibre lengths may provide different mechanical characteristics to the material. Due to the length of fibres, they can entangle with each other and impart fibre to fibre interbonds that bring strength to the foam structure. The aspect ratio, i.e. the ratio of the fibre length to the fibre width, of the cellulose fibres used for the preparation of the carbon foam according to the present invention can be at least 10, at least 25, at least 50, at least 75, or at least 100, which provides for preservation and stabilization of the foam structure during the drying procedure. The aspect ratio can be up to 6500, or preferably up to 2000.

The high aspect ratio, i.e. the length to width ratio, of the cellulose fibres may provide flexibility to the final bio-based carbon foam. The predominant orientation of cellulose fibres enables the formation of different macro-structures in the foam that may affect the outgassing during carbonization and hence the carbonization kinetics, which in turn may influence the properties of the final bio-based carbon foam.

Lignin are cross-linked phenolic polymers that provides rigidity in the formation of cell walls, especially in wood and bark, in that it fills the spaces in the cell wall between cellulose, hemicellulose, and pectin components. The polymers lack a defined primary structure, and the exact chemical composition of lignin varies from species to species, but it is relatively hydrophobic and rich in aromatic subunits. Lignin is often an undesired by-product in the manufacture of cellulose and is the biggest renewable source of carbon in the world after cellulose. Lignin for use in the present method preferably has a specific mean particle size in the range of from 0.1 to 10 μm. Particles within the preferred size range provides for a good adherence to the cellulose fibres. For some applications, the ash content of the lignin should preferably be as low as possible.

The density of the carbon foam is determined with the equation (1):

$$\text{Density} = \frac{m}{v} \tag{1}$$

where, m is the mass of a piece of the carbon foam, and V is the volume of said piece of carbon foam.

The void spaces in the carbon foam according to the present invention may be in the form of interconnected pores, such as that at least 50%, at least 70%, or at least 80%, of the total volume of the void spaces of porous material according to the present invention may comprise interconnected pores. The mean pore diameter and the pore volume may be determined by conventional methods, such as by image analysis using microscopy. The porosity of the carbon foam may be in the range of 50 to 99%. The term "porosity", $\phi$, is used for the ratio between the total volume of the pores, $V_P$, and the total volume, V, of the carbon foam. The porosity may be determined by conventional methods, such as by image analysis using microscopy.

The "specific surface area" denotes the total surface area of the solid material per unit mass and can be determined by pycnometry. The carbon foam according to the present invention may have a specific surface area of from 500 to 1500 $m^2/g$.

It should be noted that embodiments and/or features and/or advantages described in the context of one of the aspects and/or embodiments of the present invention may also apply mutatis mutandis to all the other aspects and/or embodiments of the invention.

EXAMPLES

Example 1: Carbonized Lignin/Cellulose Foams with Different Ratios of Cellulose to Biomass Component A plurality of slurries is prepared by mixing different proportions of cellulose fibres and lignin in an aqueous solvent. Each slurry is foamed by mechanical whipping to obtain a lignin-cellulose fibre foam. Each lignin-cellulose fibre foam is dried and then carbonized to obtain a carbon foam. The obtained carbon foams are characterized by determining different properties such as the mean pore diameter and density.

The invention claimed is:

1. A bio-based carbon foam, the bio-based foam comprising:

cellulose fibres and a biomass component that have been carbonized, wherein a density of the bio-based carbon foam is between 10 to 80 $kg/m^3$, and a mean pore diameter of bio-based carbon foam is from 0.5 to 10 mm.

2. The bio-based carbon foam according to claim 1, comprising a porous core having a density and wherein the bio-based carbon foam becomes denser closer to outer surfaces.

3. A method for the preparation of a bio-based carbon foam, the method comprising:

a. suspending cellulose fibres and a biomass component in a liquid medium to obtain a slurry, wherein the biomass component is selected from lignin and lignocellulosic materials;

b. foaming said slurry to obtain a biomass-cellulose fibre foam; and c. carbonization of the biomass-cellulose fibre foam to obtain a bio-based carbon foam, wherein the bio-based foam comprises a density between 10 to 80 $kg/m^3$, and a mean pore diameter of bio-based carbon foam is from 0.5 to 10 mm.

4. The method according to claim 3, wherein a weight proportion of the biomass component to the cellulose fibres is between 3:1 to 1:3, as calculated on a dry material.

5. The method according to claim 3, wherein the liquid medium for suspending the cellulose fibres and the biomass component is water.

6. The method according to claim 3, wherein the slurry has a total solid content of 0.1-40 wt %, as calculated on a total weight of the slurry.

7. The method according to claim 3, wherein the biomass component is in a form of particles.

8. The method according to claim 3, wherein the biomass-cellulose fibre foam is cast into a desired shape.

9. The method according to claim 3, wherein the biomass-cellulose fibre foam is dried before the carbonization.

10. The method according to claim 3, wherein the biomass component is lignin.

11. The method according to claim 3, wherein the carbonization comprises raising a temperature in one or more steps at rates between 1 to 100° C./min, until a maximum temperature, $T_{max}$, in the range from 700 to 1500° C., is reached.

12. The method according to claim 3, wherein the carbonization is performed under inert gas.

* * * * *